United States Patent [19]

Shannon

[11] 4,296,169

[45] Oct. 20, 1981

[54] WALLBOARD HAVING IMPROVED DRYING RATE DUE TO PLURAL CONTACTING FIBER NETWORKS

[75] Inventor: Richard F. Shannon, Lancaster, Ohio

[73] Assignee: Owens-Corning Fiberglas Corporation, Toledo, Ohio

[21] Appl. No.: 118,332

[22] Filed: Feb. 4, 1980

[51] Int. Cl.$^3$ .......................... B32B 5/08; B32B 5/12; B32B 5/26; B32B 13/02

[52] U.S. Cl. ...................................... 428/298; 156/42; 428/302; 428/303; 428/340; 428/428; 428/438; 428/537

[58] Field of Search .................. 156/42; 428/298, 303, 428/340, 428, 438, 537, 538, 302

[56] References Cited

U.S. PATENT DOCUMENTS

| | | |
|---|---|---|
| 2,681,863 | 6/1954 | Crees . |
| 3,062,670 | 11/1962 | Marzocchi et al. . |
| 3,147,127 | 9/1964 | Shannon . |
| 3,289,371 | 12/1966 | Pearson et al. . |
| 3,749,638 | 7/1973 | Renaud et al. . |
| 3,944,698 | 3/1976 | Dierks et al. .................... 156/42 |
| 3,948,673 | 4/1976 | Chase . |
| 3,993,822 | 11/1976 | Knauf et al. ........................ 156/42 |
| 4,185,138 | 1/1980 | Graham . |
| 4,187,275 | 2/1980 | Bracalielly . |
| 4,195,110 | 3/1980 | Dierks et al. ........................ 156/42 |

FOREIGN PATENT DOCUMENTS 1146506  3/1969  United Kingdom ................. 156/42

*Primary Examiner*—James C. Cannon
*Attorney, Agent, or Firm*—Ronald C. Hudgens; Robert F. Rywalski

[57] ABSTRACT

A board comprising: two sheets of paper spaced apart and bonded to a core of inorganic cementitious material, said core having a network of glass monofilaments jack-strawed into a three-dimensional water transmitting network extending between its surfaces, and at least one of said layers of paper having a network of glass monofilaments jack-strawed into a water transmitting network that extends between its major surfaces with said network in said paper being in water transmitting contact with said network of said core. Preferably the core is gypsum having a density of about 40-65 pounds per cubic foot.

6 Claims, No Drawings

WALLBOARD HAVING IMPROVED DRYING RATE DUE TO PLURAL CONTACTING FIBER NETWORKS

TECHNICAL FIELD

The present invention relates to board formed by two sheets of cellulosic paper having an inorganic cement core therebetween.

BACKGROUND OF THE INVENTION

It has long been known to produce products of the above described type, and currently such sandwich or laminated type products having a gypsum core are produced and sold as wallboard in a multibillion square foot market per year in the United States alone. Wallboard is made by mixing calcium sulfate hemihydrate with excess water, and sometimes fillers, to form a slurry which is deposited or cast between two layers of paper to form a sandwich. The hemihydrate hardens in place to form the dihydrate. The sandwich is moved on a conveyor to a long drying oven, where excess water is removed. The wallboard making machines are very large and expensive and the art has long desired to speed up the drying of the sandwich and hence the output of the machines.

Very few improvements have occurred in the wallboard manufacturing art. An early improvement of the product occurred when glass was employed as a reinforcement. This development is disclosed in U.S. Pat. No. 2,681,863. The patent indicates that a product having improved strength and fire resistance results.

It is an object of the present invention to increase the rate of drying of sandwiches comprising an inorganic core having layers of cellulosic paper on its surfaces, and, more particularly, to increase the throughput of wallboard making machines.

According to principles of the present invention, in has been discovered that wallboard which contains a random, three-dimensional, jack-strawed network, of glass monofilaments, having hydrophilic surfaces, which extends from within the core to the evaporative surface of the cellulosic paper skins will dry, by more than approximately 10%, faster than does wallboard in which the cellulosic paper contains no such network of monofilaments. Desirably, the individual glass monofilaments have a diameter of less than about 0.00080 inch and preferably will have a length of less than about 1 inch, e.g. a length of about ⅛ inch to about 1 inch and more desirably about one-quarter to about one-half inch.

As is well known in the art, textile glass fibers are produced by attenuating a plurality of monofilament glass streams issuing from a bushing into smaller diameter monofilaments which monofilaments have a size applied thereto. The sized monofilaments are then gathered into a strand, or bundle, of bound, parallel, individual monofilaments. In order to obtain the random, three-dimensional, or jack-strawed, network of monofilaments for use herein, the size employed should be water soluble, or water dispersible, i.e., the size in general should be hydrophilic, so that the size will allow the individual monofilaments making up the bundles, or strands, to be readily dispersed with mixing in water but without substantial reduction in monofilament length. Numerous water soluble and water dispersible sizes are well known in the art.

It is know that nascent glass has an angle of wetting that approaches zero, and it is theorized that spreading of water along the glass surfaces accounts for the drying effect of the present invention. To accomplish this drying effect, the monofilaments should be touching or so nearly touching that the water can spread along their surfaces, all of the way from the core to the exposed surface of the cellulosic paper where evaporation takes place. Suitably, in order to obtain the water transmitting relationship to effect improved drying, the monofilaments will be present in a jack-strawed arrangement in the cellulosic paper in an amount of about 0.02% to about 4% by weight of the paper but most desirably in an amount of about 0.05%–1.0%. Outstanding results will be realized when the amount is about 0.05% to about 0.3%. Similarily such water transmitting relationship will suitably be obtained by employing about 1,200 to about 20,000 lineal inches of monofilaments per cubic inch of cementitious core material.

In accordance with prior art practices starches are added to the inorganic cementitious slurries to bond the cellulosic paper skins to the core after it is dried. To accomplish this the starch is solvatable to a degree wherein it migrates with the excess water through the core to be adjacent the cellulosic paper skin.

DESCRIPTION OF THE PREFERRED EMBODIMENTS

EXAMPLE 1

Twenty seven grams of Kraft paper dispersed in water were blended and mixed with one quarter gram of chopped glass fiber strands, (each strand being about one-half inch in length and having 408 monofilaments with each of the monofilaments having a diameter of about 0.00036 inch) so as to completely disperse the individual monofilaments. The size employed to produce the strands had the following composition:

| Materials | Percent by Weight |
| --- | --- |
| Polyvinyl Acetate plasticized with 2.5–3.8% dibutyl phthalate | 7.35 |
| Imperial Chemical Industries' Cirrasol 185 AE (Condensate of pelargonic acid & tetraethylene pentamine stablized with acetic acid) | 0.12 |
| Imperial Chemical Industries' Cirrasol 185 AN (Condensate of caprylic acid & tetraethylene pentamine stablized with acetic acid) | 0.05 |
| Glacial Acetic Acid | 0.17 |
| NH$_4$OH | 0.05 |
| Rohm & Haas' Triton X-100 | 0.08 |
| NH$_4$Cl | 0.13 |
| Water | 92.08 |

Thereafter, the mixed slurry was diluted with additional water and then added to the deckle box of a laboratory paper making machine. The water was drained and a paper approximately 12 inches square was cast, removed and dried. A coating of a nonionic starch adhesive was sprayed onto one surface of the paper in an amount just sufficient to bond the paper to gypsum using the following procedure. Alternatively a nonionic water soluble starch adhesive can be added to the core producing slurry.

A gypsum producing slurry was made by mixing 700 grams of calcium sulfate hemihydrate with 300 grams of water and ½ gram of a keratin set-retarder and about 0.7 grams of the above strand so as to disperse the individual monofilaments. The Kraft paper made as above described was placed on top of a screen and the edges fastened thereto by means of waterproof tape. The screen with the Kraft paper thereon was placed on a Lucite plate, and a ½ inch spacer frame was placed on top of the edges of the paper. Another sheet of the above paper was taped onto another screen and the two were placed on another Lucite plate. The hemihydrate slurry was poured into the 12 by 12 inch cavity in the ½ inch thick spacer plate, and the second paper was placed on top of the gypsum with the second Lucite plate on top. A one kilogram weight was placed on top of the second Lucite plate. Excess slurry was forced out over the edges of the spacer plate, and thereafter, the assemblage was left for two hours to allow the dihydrate to form and bond the paper to the core. Thereafter the paper coated gypsum was removed, was weighed, and placed in an oven at 100° F. The sample was removed every ½ hour and weighed to determine its loss of water.

The above process was repeated excepting that the Kraft paper was made without having glass monofilaments therein. The sandwich having glass monofilaments in the Kraft paper skins dried approximately 15% faster than the sandwich having no glass monofilaments in the Kraft paper. As a matter of fact, the sample having glass monofilaments in the Kraft paper dries substantially as fast as a slab of gypsum of the same thickness and having monofilaments therein, but having no skins of Kraft paper thereon.

The core can be made from any suitable inorganic cementitious material such as magnesium oxide cements, perlite or other light weight aggregates e.g., perlite or vermiculite or pumice, bonded by silicates, aluminum silicate cements, Portland cement, etc. In such case, the core preferably has between 0.05% and 0.8% by weight of glass monofilaments, and most preferably approximately 0.20%.

The paper that is made using the glass monofilaments will have the monofilaments extending between its opposite major surfaces. Wallboards so made therefore have glass monofilaments running through substantially all pores and pockets of water through the layers of paper to the external surfaces where evaporation takes place. As water evaporates from the exposed glass surfaces on the surfaces of the paper, it is replaced by water spreading along the monofilaments from the internal pockets of water in the center of the gypsum.

By using the present invention, the temperatures of the prior art ovens do not have to be increased, and still a substantial increase, e.g. 10–20%, in drying rate is realized. This means that the rate of movement of the conveyors of the wallboard making machinery can be speeded up to give a significant increase in production.

While the invention has been described in considerable detail, I do not wish to be limited to the particular embodiments shown and described; it is my intention to cover hereby, all novel adaptations, modifications, and arrangements thereof which come within the practice of those skilled in the art to which the invention relates.

I claim:

1. A board comprising: two sheets of paper spaced apart and bonded to a core of inorganic cementitious material, said core having a network of dispersed glass monofilaments jack-strawed into a three-dimensional water transmitting network extending between its surfaces, and at least one of said layers of paper having a network of dispersed glass monofilaments jack-strawed into a water transmitting network that extends between its major surfaces with said network in said paper being in water transmitting contact with said network of said core.

2. The board of claim 1 wherein both sheets of paper have said monofilament network therein.

3. The board of claim 2 wherein said sheets of paper have between 0.05% and 1.0% by weight of said monofilaments therein and between 1,200 and 20,000 lineal inches of monofilaments per cubic inch of core material.

4. The board of claim 3 wherein said cementitious material comprises gypsum.

5. The board of claim 1 wherein said core has a density of about 40–65 pounds per cubic foot.

6. The board of claim 1 wherein said monofilaments have a diameter of less than 0.00080 inch.

* * * * *